US010339481B2

(12) United States Patent
Canaran et al.

(10) Patent No.: US 10,339,481 B2
(45) Date of Patent: Jul. 2, 2019

(54) SYSTEMS AND METHODS FOR GENERATING USER INTERFACE-BASED SERVICE WORKFLOWS UTILIZING VOICE DATA

(71) Applicant: Liquid Analytics, Inc., Toronto, Ontario (CA)

(72) Inventors: Vishvas Trimbak Canaran, Miami, FL (US); David Andrew Ellis, Toronto (CA); Phuonglien Thi Nguyen, Miami, FL (US); Andrea Kallies, Reston, VA (US)

(73) Assignee: Liquid Analytics, Inc., Toronto (CA)

( * ) Notice: Subject to any disclaimer, the term of this patent is extended or adjusted under 35 U.S.C. 154(b) by 217 days.

(21) Appl. No.: 15/419,352

(22) Filed: Jan. 30, 2017

(65) Prior Publication Data

US 2017/0220963 A1 Aug. 3, 2017

Related U.S. Application Data

(60) Provisional application No. 62/288,923, filed on Jan. 29, 2016.

(51) Int. Cl.

| | |
|---|---|
| ***G06Q 10/06*** | (2012.01) |
| ***G10L 15/18*** | (2013.01) |
| ***G10L 15/22*** | (2006.01) |
| ***G06F 3/0484*** | (2013.01) |
| ***G06N 20/00*** | (2019.01) |
| ***G06F 3/16*** | (2006.01) |

(52) U.S. Cl.
CPC ....... *G06Q 10/0633* (2013.01); *G06F 3/0484* (2013.01); *G06F 3/167* (2013.01); *G06N 20/00* (2019.01); *G10L 15/22* (2013.01); *G10L 15/18* (2013.01); *G10L 2015/223* (2013.01)

(58) Field of Classification Search
CPC ......... G10L 15/22; G10L 15/26; G06F 9/451; G06Q 10/06
See application file for complete search history.

(56) References Cited

U.S. PATENT DOCUMENTS 5,950,123 A * 9/1999 Schwelb ........... H04M 1/72552 340/4.14
6,233,559 B1 * 5/2001 Balakrishnan, Sr. ... G06F 9/451 704/275
6,658,093 B1 * 12/2003 Langseth .............. G06Q 10/10 379/207.02

(Continued)

FOREIGN PATENT DOCUMENTS

WO 2001026350 A1 4/2001
WO 2017132660 A1 8/2017

OTHER PUBLICATIONS

Casati, Fabio et al., Adaptive and Dynamic Service Composition in eFlow HP Laboratories, HPL2000-39, Mar. 2000 (Year: 2000).*

(Continued)

*Primary Examiner* — Scott L Jarrett
(74) *Attorney, Agent, or Firm* — Polsinelli PC

(57) ABSTRACT

Aspects of the present disclosure provide a mechanism to directly interact and access with micro-services and/or services using natural-language and machine intelligence and algorithmic learning so that users may access desired micro-services and/or services with minimal interaction.

20 Claims, 3 Drawing Sheets

(56) References Cited

U.S. PATENT DOCUMENTS

| | | | | |
|---|---|---|---|---|
| 7,082,391 | B1 * | 7/2006 | Merrill | 704/231 |
| 7,096,163 | B2 * | 8/2006 | Reghetti | G10L 15/26 703/1 |
| 7,188,067 | B2 * | 3/2007 | Grant | G10L 15/193 704/231 |
| 7,620,894 | B1 * | 11/2009 | Kahn | G06F 3/0481 715/707 |
| 7,885,456 | B2 * | 2/2011 | Shi | G06K 9/6296 382/161 |
| 9,111,538 | B2 * | 8/2015 | Lau | G10L 15/22 |
| 9,159,322 | B2 * | 10/2015 | Burke | G10L 15/22 |
| 9,318,108 | B2 * | 4/2016 | Gruber | G10L 15/1815 |
| 9,378,467 | B1 * | 6/2016 | Chaiyochlarb | G06N 99/005 |
| 9,437,206 | B2 * | 9/2016 | Yu | G10L 15/1822 |
| 10,049,664 | B1 * | 8/2018 | Indyk | H04L 67/327 |
| 10,210,953 | B2 * | 2/2019 | Greer | G16H 40/20 |
| 2002/0095293 | A1 * | 7/2002 | Gallagher | H04M 3/493 704/270 |
| 2005/0114140 | A1 * | 5/2005 | Brackett | G10L 15/01 704/270 |
| 2005/0246713 | A1 * | 11/2005 | Creamer | G06F 9/5055 719/310 |
| 2006/0041433 | A1 * | 2/2006 | Slemmer | G06F 9/45512 704/275 |
| 2006/0136428 | A1 * | 6/2006 | Syeda-Mahmood | G06F 17/30286 |
| 2008/0097760 | A1 * | 4/2008 | Hong | G10L 15/193 704/251 |
| 2008/0250387 | A1 * | 10/2008 | Reddy | G06F 9/453 717/104 |
| 2008/0256200 | A1 * | 10/2008 | Elliston | H04L 51/04 709/206 |
| 2009/0113077 | A1 * | 4/2009 | Dahlen | H04L 65/1063 709/250 |
| 2009/0125628 | A1 * | 5/2009 | Dahlen | H04L 67/16 709/227 |
| 2009/0214117 | A1 * | 8/2009 | Ma | G06K 9/00409 382/187 |
| 2009/0319267 | A1 * | 12/2009 | Kurki-Suonio | G10L 15/30 704/235 |
| 2010/0087175 | A1 * | 4/2010 | Roundtree | H04M 3/42178 455/414.1 |
| 2010/0088701 | A1 * | 4/2010 | Greiner | G06Q 10/00 718/100 |
| 2011/0054647 | A1 * | 3/2011 | Chipchase | H04M 3/42127 700/94 |
| 2011/0276598 | A1 * | 11/2011 | Kozempel | G06F 17/30684 707/770 |
| 2013/0086481 | A1 * | 4/2013 | Balasaygun | G06F 3/0481 715/745 |
| 2013/0290856 | A1 * | 10/2013 | Beveridge | G06F 9/452 715/740 |
| 2014/0081652 | A1 | 3/2014 | Klindworth | |
| 2014/0297348 | A1 | 10/2014 | Ellis | |
| 2014/0337814 | A1 * | 11/2014 | Kalns | G06F 8/00 717/100 |
| 2015/0294089 | A1 * | 10/2015 | Nichols | G06Q 50/22 705/3 |
| 2015/0365528 | A1 * | 12/2015 | Lu | H04M 3/4936 455/414.1 |
| 2016/0098996 | A1 * | 4/2016 | Ding | G10L 17/22 704/232 |
| 2017/0220963 | A1 * | 8/2017 | Canaran | G06F 3/0484 |
| 2017/0221471 | A1 * | 8/2017 | Sharifi | G06F 17/2775 |
| 2017/0344887 | A1 * | 11/2017 | Ahmed | G06N 5/022 |

OTHER PUBLICATIONS

Liu, Jiming et al., An Adaptive User Interface Based on Personalized Learning Human Centered Computing, IEEE Intelligent Systems, 2003 (Year: 2003).*

Mühlhäuser, M., Context Aware Voice User Interfaces for Workflow Support, Darmstadt 2007 (Year: 2007).*

Providing Help as a Service Using a Natural Language Question Answer System IP.com, Aug. 26, 2014 (Year: 2014).*

Cardoso, Jorge et al., Semantic Web Services and Web Process Composition First International Workshop, SWSWPC 2004, Jul. 2004 (Year: 2004).*

International Searching Authority, International Search Report and Written Opinion, issued in connection with PCT/US2017/015607, dated Apr. 4, 2017 (8 pages).

* cited by examiner

SYSTEMS AND METHODS FOR GENERATING USER INTERFACE-BASED SERVICE WORKFLOWS UTILIZING VOICE DATA

CROSS REFERENCE TO RELATED APPLICATIONS

The present non-provisional utility application claims priority under 35 U.S.C. § 119(e) to provisional application No. 62/288,923 entitled "Systems And Methods For Dynamic Prediction Of Workflows," filed on Jan. 29, 2016, and which is hereby incorporated by reference herein.

TECHNICAL FIELD

Aspects of the present disclosure relate to platforms for integrating heterogeneous technologies and/or applications into services, and more particularly, the automatic and dynamic prediction and selection of such services for inclusion into a workflow.

BACKGROUND

Many business enterprises operate using a variety of heterogeneous technologies, business applications, and other technological business resources, collectively known as "point solutions," to perform different business transactions. For example, point solutions may be used for consumer transactions and business data management. In order to meet the changing needs of a business, legacy systems are gradually modified and extended over many years, and often become fundamental to the performance and success of the business. Integrating these systems into existing infrastructure and maintaining these systems may involve redundant functionality and data, and eliminating those redundancies can be difficult, expensive, and time consuming. The result is that many enterprises have too many interfaces and disparate point solutions for their user base to manage.

Conventional methodologies for integrating, reducing and eliminating redundancies, and/or extending existing business technologies and applications, or integrating existing business technologies and applications with newer point solutions is difficult because of inconsistent interfaces, fragmented, differently formatted, and/or redundant data sources, and inflexible architectures.

It is with these problems in mind, among others, that various aspects of the present disclosure were conceived.

BRIEF DESCRIPTION OF THE FIGURES

The foregoing and other objects, features, and advantages of the present disclosure set forth herein will be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

DETAILED DESCRIPTION

Figure 1:
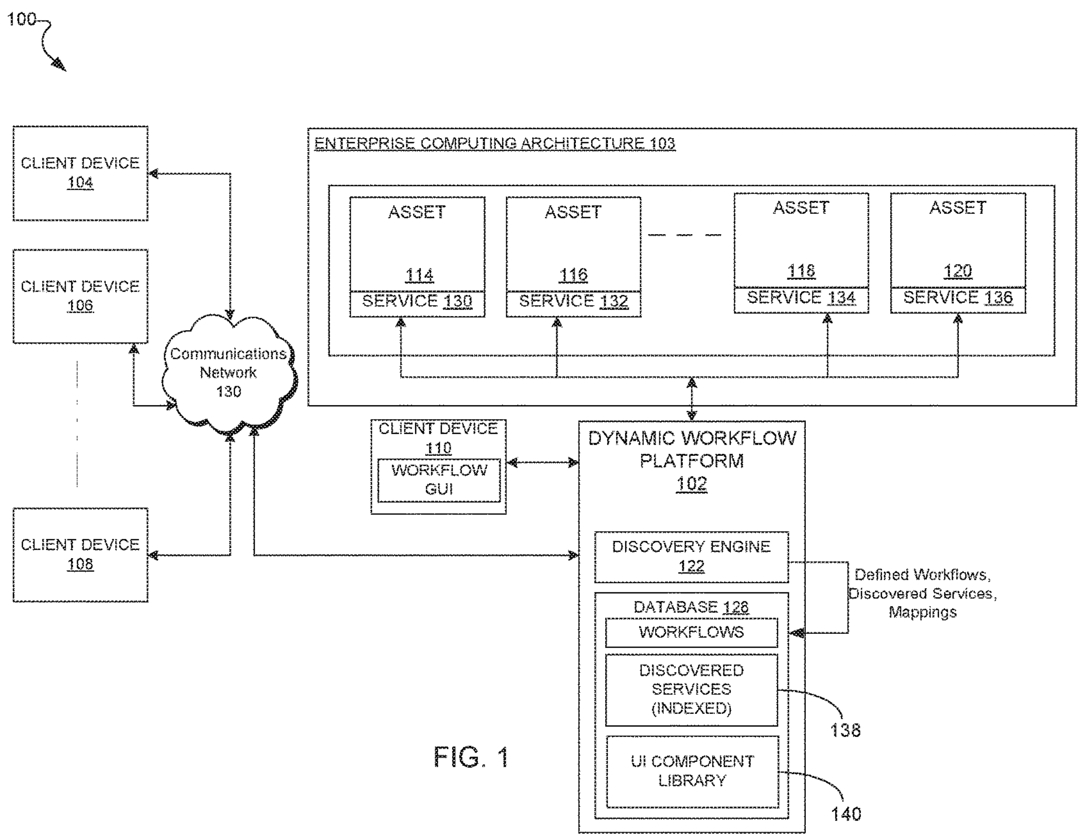
FIG. 1 is a block diagram illustrating a computing architecture for dynamically predicting and executing workflows, according to aspects of the present disclosure.

Aspects of the present disclosure involve systems and methods for providing system-predicted workflows to end users, such as customers, partners, and/or information technology ("IT") developers, dynamically and in real-time. In various aspects, a dynamic workflow platform ("DWP") accesses different business application functionalities and business data that extend across a business enterprise and automatically generates and/or otherwise predicts a set of reusable business capabilities and/or workflows. Subsequently, end users, such as IT developers, may access and use the business capabilities and/or workflow(s) to create new business applications and/or extend existing business applications.

In various aspects, to facilitate the prediction of workflows, the DWP may provide access to an initial set of "services" corresponding to the business enterprise to end users. Generally speaking, a business "service" represents a discrete piece of functionality that performs a particular business task by accessing various business functionality and/or data of a given enterprise. In some embodiments, each service may represent a standardized interface that is implemented independent of the underlying business functionality and/or business data. Separating the business functionalities and business data from the interface eliminates dependence between the various business assets so that changes to one business asset do not adversely impact or influence other business assets. Additionally, the separation allows the underlying business asset functions and business data to change without changing how an end user interacts with the interface to access such functions and data. In some embodiments, the service may be a micro-service, which is a service that conforms to a particular type of technology design pattern (code described by a standardized and discoverable web service that does one specific function).

Based upon how the end users interact with the services of the business enterprise, the DWP may automatically and continuously (e.g., in real-time) generate and/or otherwise predict new business capabilities and/or workflows, or refine and/or redefine existing business capabilities and/or workflows. In some embodiments, the DWP may employ natural language mechanisms (e.g., processing a string of text to a symbolic service graph) or machine learning mechanisms to process the input and interactions of users to predict or otherwise generate the workflows dynamically. For example, in one embodiment, a user may request via voice access a service (alternatively referred to as a work function). The voice data may then be transposed to text, wherein the text maps to a symbolic service graph. In such an embodiment, the symbolic service graph is a representation of a discoverable Application Programming Interface ("API"), such as a Swagger discoverable open RESTFUL API to a business function. Machine Intelligence mechanisms are then employed to traverse the symbolic service graph and select one or more services, and their parameters, that map to the spoken/text request from the user. Once the service has been identified, the DWP dynamically generates a user experience using machine intelligence based on the API to the micro-service. This user experience provides the interaction for the user. While the embodiment above refers to Swagger, it is contemplated that other open-standard documentation specifications that describe APIs such as Restful API Modeling Language (RAML), Open API, and the like.

Thus, the DWP 102 automatically generates a user-experience from multiple back-end services with a simple directed voice (e.g., audio data) or text interaction. The DWP automatically learns about how such services interact and automatically automates the interaction into a workflow, which may be provided as a dynamically generated single user-experience. For example, assume a user is interested in solving the business problem of booking travel tickets. The DWP may identify that Expedia represents a service to book travel tickets. Additionally, the DWP may identify that Expensify represents a service that user use to expense travel costs. Thus, the DWP may automatically generate a single workflow, "Travel", that combines the Expedia service and the Expensify service, and thereby allow user to book travel tickets and expense the cost of tickets using voice and/or audio data and/or text interaction with the generated Travel workflow. Once the workflow is generated, the DWP may automatically and continuously optimize the workflow by continuously monitoring user-interactions at the generated workflow and/or monitoring how users interact with similar work flows to identify repeatable patterns. Referring to the travel tickets example above, the DWP may monitor the Travel workflow and other workflows related to traveling, and any data gathered during the monitoring to, in real-time, mat be used to optimize or otherwise modify the generated Travel workflow.

FIG. 1 illustrates an example computing network and/or networking environment 100 for dynamically generating or otherwise predicting business capabilities and/or workflows from on one or more services corresponding to a business enterprise, based on user input and interactions, according to one embodiment. The computing network 100 may be an IP-based telecommunications network, the Internet, an intranet, a local area network, a wireless local network, a content distribution network, or any other type of communications network, as well as combinations of networks. For example, in one particular embodiment, the computing network 100 may be a telecommunications network including fiber-optic paths between various network elements, such as servers, switches, routers, and/or other optical telecommunications network devices that interconnect to enable receiving and transmitting of information between the various elements as well as users of the network.

In one particular embodiment, to support the use of enterprise services workflows, the DWP 102 may implement and/or otherwise support a service-oriented architecture ("SOA") of an enterprise computing architecture 103. The SOA architecture may be implemented according to a Representational State Transfer ("REST") architectural style, Micro-service style, and/or the like. SOA generally describes the arrangement, coordination, and management of heterogeneous computer systems. In a business context, SOA encapsulates and abstracts the functionality and implementation details of different business assets into a number of individual services. A business asset refers to any disparate, external, internal, custom, and/or proprietary business software application, database, technology, system, packaged commercial application, file system, or any other type of technology component capable of performing business tasks or providing access to business data. In the illustrated embodiment, one or more business assets 114-120 have been abstracted into one or more services 130-136. The services 130-136 may be accessible by users through a well-defined shared format, such as a standardized interface, or by coordinating an activity between two or more services 130-136. Users access the service interfaces, for example over a network, to develop new business applications or access and/or extend existing applications.

Although the illustrated embodiment depicts the DWP 102 as directly communicating with the enterprise computing architecture 103, it is contemplated that such communication may occur remotely and/or through a network. Moreover, the services 130-136 of the business assets 114-120 may be stored in some type of data store, such as a library, database, storage appliance, etc., and may be accessible by the DWP 102 directly or remotely via network communication. In one specific example, the one or more of the services 130-136 may not be initially known or may not have been discovered by the DWP 102. Thus, the DWP 102 may automatically discover the previously unknown services and provide and automatically catalogue and index the services in the database 128, as illustrated in FIG. 1 at 138.

Referring again to FIG. 1, the DWP 102 may be a server computing device that functionally connects (e.g., using communications network 100) to one or more client devices 104-110 included within the computing network 100. The one or more client devices 104-110 may service the need of users interested in accessing enterprise services. To do so, a user may interact with the one or more of the client device 104-110 and provide input, which may be processed by a discovery engine 122 of the DWP 102 that manages access to such services. The one or more client devices 104-110 may be any of, or any combination of, a personal computer; handheld computer; mobile phone; digital assistant; smart phone; server; application; wearable, IOT device and the like. In one embodiment, each of the one or more client devices 104-110 may include a processor-based platform that operates on any suitable operating system, such as Microsoft® Windows®, Apple OSX®, Linux®, and/or the like that is capable of executing software. In another embodiment, the client devices 104-110 may include voice command recognition logic and corresponding hardware (e.g., a microphone) to assist in the collection, storage, and processing of speech models and voice commands.

The discovery engine 122 may process the input identifying end user interactions with the various services of the enterprise computing architecture 103 and automatically predict or otherwise generate new business capabilities and/or workflows. More specifically, the discovery engine 122 of then DWP 102 may automatically combine one or more of the individual enterprise services into a new workflow. Generally speaking, a workflow represents a collection of functionalities and related technologies that perform a specific business function for the purpose of achieving a business outcome or task. More particularly, a workflow defines what a business does (e.g. ship product, pay employees, execute consumer transactions) and how that function is viewed externally (visible outcomes) in contrast to how the business performs the activities (business process) to provide the function and achieve the outcomes. For example, if a user were interested in generating a workflow to execute a sale of a purchase made online via a web portal, a user may interact with the one or more client devices 104-110 and provide input identifying various services of the enterprise computing architecture 103 related to web portals, consumer transactions, sales, shopping carts, etc., any of which may be required to properly execute the transaction. Based upon such input, the discovery engine 122 may process the input and predict a workflow that combines one or more of the services into a singular user interface within the application exposing the reusable business capability. For example, a workflow may combine access to a proprietary product database and the functionality of a shopping cart application to provide the workflow for executing a sale via a web portal. Then, the workflow may be reused in multiple high-level business applications to provide product sale business capabilities. The workflows may be stored or otherwise maintained in a database 128 of the DWP 102. Although the database 128 of FIG. 1 is depicted as being located within the DWP 102, it is contemplated that the database 128 may be located external to the DWP 102, such as at a remote location, and may remotely communicate with the DWP 102.

Figure 2:
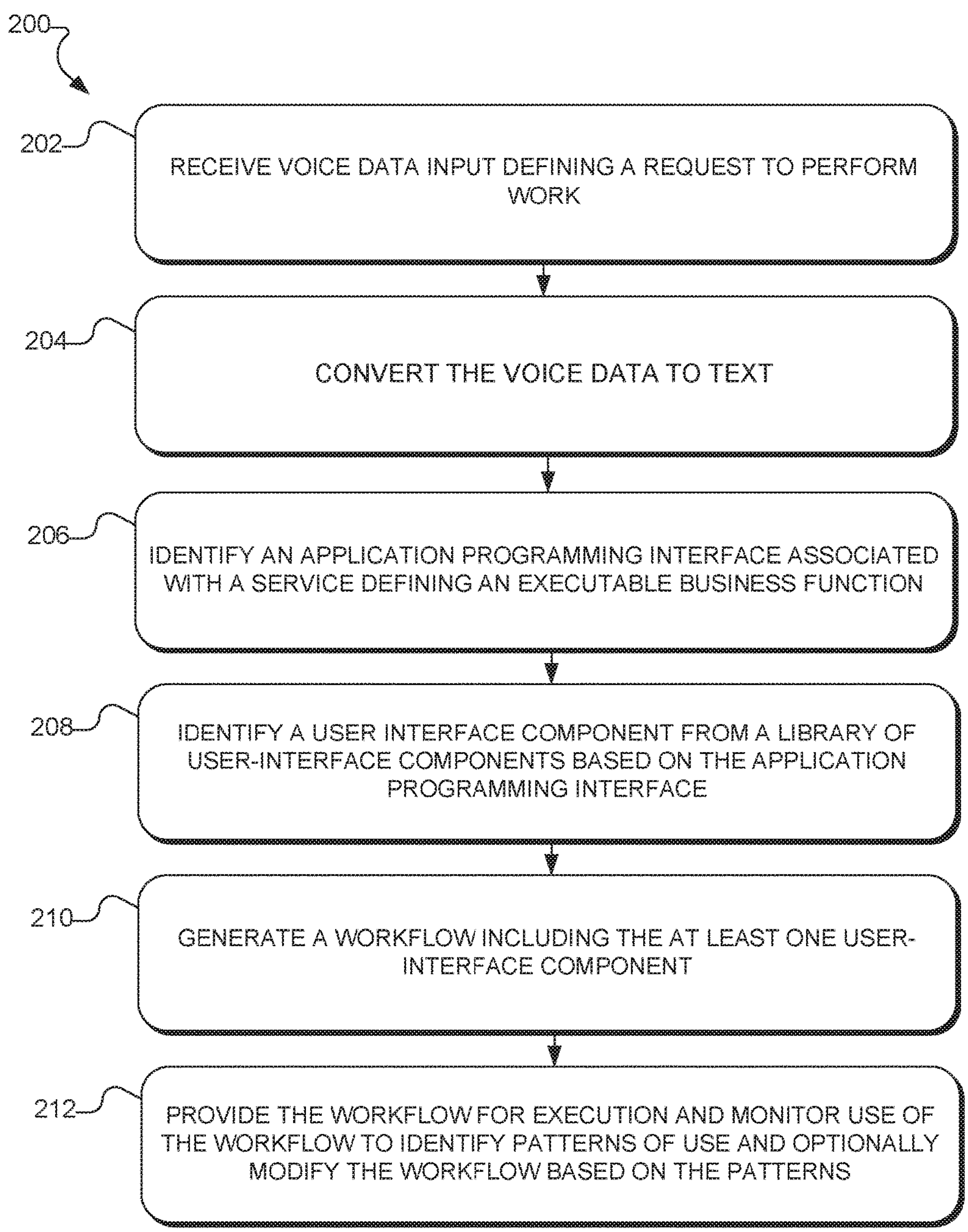
FIG. 2 is a flowchart illustrating an example process for dynamically predicting workflows, according to aspects of the present disclosure.

Referring now to FIG. 2 and with reference to FIG. 1, an illustrative process 200 for dynamically predicting and/or otherwise generating a workflow within an enterprise computing architecture is provided. As illustrated, process 200 begins with receiving voice data input defining a request to perform work, such as the performance of a task or operation with a business enterprise (operation 202). Referring again to FIG. 1, the DPS 102 may receive input in the form of audio or voice data, such as for example, in the form of one or more speech models or voice commands or phrases, wherein the voice data that defines instructions for executing or otherwise performing various work and/or workflows within a business enterprise. More specifically, the DWP 102 may generate or otherwise initialize and provide a graphical user-interface for display to the one or more client devices 104-110. The graphical user-interface may include various components, buttons, menus, and/or other functions to help a user identify a particular enterprise service of the services 130-136. In other embodiments, the graphical-user interface may be connected to various input components of the one or more client devices 104-110 capable of capturing voice data (e.g., speech), such as a microphone, speaker, camera, and/or the like. For example, a user may ask a question to the generated graphical-user interfaced presented at a mobile device and thereby provide voice data.

Referring again to FIG. 2, the received voice data is transformed from voice data (e.g., speech) to text (operation 204). Referring to FIG. 1, the DWP 102 may automatically convert the voice data from speech to text using any suitable speech recognition algorithms and/or natural language processing algorithms.

Referring again to FIG. 2, the text is processed to identify an application programming interface associated with a service currently available within the enterprise computing architecture, or elsewhere (operation 206). As illustrated in FIG. 1, the discovery engine 122 of the DWP 102 automatically searches the database 128 to determine whether the text can be mapped (e.g., via the symbol map) to a known application programming interface that provides access or is otherwise associated with one of the known services 130-136 and thereby identifiable by text. If so, the applicable application programming interface is identified and returned.

In one specific example, the text generated from the voice data may be mapped to a symbol map or symbol graph. More specifically, each of the identifiable APIs may be represented as a collection of nodes in a graph or tree structure referred to as a symbol map, wherein nodes of the graph represents different services corresponding to the API and child nodes may represent parameters for the service. In one embodiment, one node may represent the end point for the API. At higher levels of the scene graph, i.e., higher nodes, the nodes may combine a set of services into a workspace. All of the parameters are stored so that the DWP 102 may share common parameters across services in a single workspace. In one specific example, the graph may also have one node above the workspace which is an APP. An app represents a single purpose application. Thus, when the DWP 102 obtains text from voice data, the DWP 102 automatically maps the text to the symbol map and determines or otherwise identifies the App and the workspace and identifies common parameters that may be shared across the services. When the DWP 102 cannot directly map the text to the symbol graph which identifies one or more services described by an API, then the DWP 102 uses Natural Language Processing mechanisms to search against the API document and find the closest API to match the text. Subsequently, the symbol graph is updated to include the newly identified services.

In some instances, a service of the services 130-136 may not be initially identifiable from the application programming interface, i.e., the service associated with the application programming interface may not yet have been discovered by the DWP 102. Thus, the DWP 102 may automatically catalogue and index the services in the database 128, as illustrated in FIG. 1 at 138.

In some embodiments, the DWP 102 may automatically store metadata with the application programming interface and/or corresponding service. As will be described in more detail below, the metadata assists with the automatic discovery, rendering, and classification of micro-services and/or services as UI Web Components, as well as to categorize the services into workflows. Typically a discoverable API may only include the name of the service accessible through the API and the required parameters. What is missing is the rest of the Schema information. Thus, the DWP 102 may generate a schema that also contains attributes that describe the API for presentation in a UI component. The DWP 102 displays a name for a field and also identifies which UI component and where that field is placed in the UI component. The DWP 102 may also have the symbol graph information corresponding to the applicable API so we can actually use existing search engines to index the symbol graph.

An illustrative example of identifying an API from text will now be provided. A portion of text obtained from voice data, (e.g., a verb) may be used to identify a particular API from the symbol graph. Other portions of the text may be mapped to various parameters of the API identified from the symbol graph. Once mapped, the DWP 102 may generate a dictionary of possible data values for a specific field of a specific API, thereby identifying all of the possible fields for the data. The DWP 102 may also consider text proximity to other words and the order of the parameters to determine additional parameters. So for example, the text "Order 20 Cases Bacardi Blue" the term "Order" may be used identify the "Order Line Item API". Subsequently, the other portions of the text may be mapped to parameters of the Order Line Item API.

Referring again to FIG. 2, at least one user-interface component ("UI component") is identified from the application programming interface (operation 208). Generally speaking, a UI component represents an interactive component with which a user may interact and thereby construct user-experiences both visual and non-visual based on the service associated with the application programming-interface used to identify the user-interface component. Thus, in one embodiment, each UI component maybe functionally connected by the DWP 102 to one or more services of the services 130-136. Referring to FIG. 1, the UI components may be stored in a UI component library 140. For example, the UI component library may contain basic UI components such as: Media and Library and Image Capture, Activities including Tasks and Appointments, Goals, Orders, Accounts, Contacts, Product and Product Catalogue, Tickets and Cases, Dashboards, Reports, List, Detail, Relationship Views. In one embodiment, the UI components may be Web Components, such as Polymer web components, although it is contemplated that other types of components may be used. In other embodiments, the UI components may be grouped or otherwise pooled into Business Domains. For example, typical Business Domains may include: Sales, Employee Self Service, Travel and Expense, Case Management, etc., allowing multiple UI components to be identified from the identification of a single UI component using the applicable application programming interface.

Referring again to FIG. 2, using a UI Component(s), the system may predict or otherwise generate a workflow for the user, or similar users (operation 210). Referring to FIG. 1, the DWP 102 may combine one or more of the UI Components from the UI Component library 140 into a workflow. The DWP 102 may identify a collection and/or sequence of UI Components and combine into workflows that can automate the completion of a task or operation within a business. In some embodiments, the generated workflows may be uniquely named so they can be directly invoked by a user using natural language. The DWP 102 employs an internal hash to identify workflows.

In some embodiments, the generated workflows may be encapsulated into a workspace containing relevant data corresponding to the workflow, a state of the workflow, and a state of an App. Workspaces are grouped into Apps, which allows the system identify an App is a collection of workflows. In one embodiment, each workflow may represent a data object from which a workplace may be generated. A specific instance of a workflow is a "workitem". Thus, the data is the workitem for the workspace object. Each workflow is described in its own workspace. For each workspace, the DWP 102 may assign a confidence factor that represents a probability. Thus, the DWP 102 includes or otherwise maintains many variations of a workplace called "Versions" and generates a certain confidence factor before providing the corresponding workflow and/or workspaces to users, thereby making the system dynamic.

Referring again to FIG. 2, once the workflow has been generated, it is automatically provided to users for access and execution and the workflow may be monitored to identify patterns that may be used to optimize and refine the workflow (operation 212). The processing of the predicted workflow may occur automatically at the DPS 102, or in response to user input provided to the graphical user-interface. Stated differently, any of the newly predicted workflows may be stored in the database 128 for later retrieval. In such an embodiment, a user may interact with a graphical user-interface that allows the user to select the workflow and initiate execution.

Upon execution and use of the workflow, the user-interactions with the workflow (e.g., the user-interactions with the UI components within the workflow) may be monitored by the DWP 102 to identify patterns. For example if users start to ignore steps within the workflow, then the DWP 102 will automatically update the workflow to remove the repeatedly skipped step. In another example, if a user delegates a step of a workflow to a workflow of another user, the DWP 102 automatically identify the delegation and automatically add the step as part of the workflow of the applicable user. Stated differently, the DWP 102 automatically and predictively adapts to workflows by learning how users react to the same or similar workflows, including knowing which items are ignored, delegated or doing work associated with a specific user context. In yet another example, if a user starts to request information corresponding to a particular portion of the workflow, such as a specification or schematic of a UI component before or after a step in the workflow, then the DWP 102 will automatically add the information to the workflow.

The execution may be monitored in other ways. For example, data is maintained at the DWP 102 corresponding to a user, such as a user profile, location, last set of data by parameters so that when navigating across work items the system can automatically fill or suggest the filling of fields based on a history of fields. Further, the DWP 102 may process historical data across multiple users and automatically update the symbol map so that the speech to text recognition of services improves and so that the mapping of parameters improves as part of the machine learning process.

Thus, aspects of the present disclosure enable a user to have natural conversations with the DWP 102, thereby making users feel like they are speaking or typing text conversationally to identify services. The DWP 102, in turn automatically initiates and manages complex workflows across multiple computing and enterprise systems, based on the speaking and text provided by the users. The DWP 102 provides recommendations on workflow and/or generates workflow based on questions (e.g., voice data) and events (e.g., user-interactions). In the specific example of providing a questions, key words and phrases of the question are mapped to specific UI components which, in turn, are combined into workflows. Based on the question that is asked, the DWP 102 either knows to return a specific workflow, or initiate another workflow.

Figure 3:
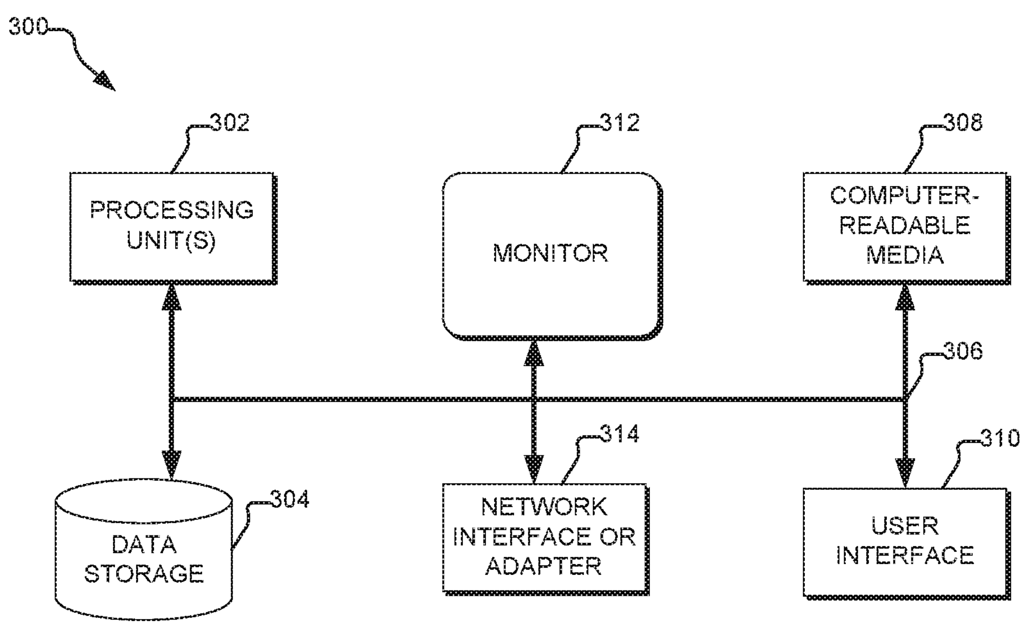
FIG. 3 is a block diagram illustrating a computing device for dynamically predicting workflows, according to aspects of the present disclosure.

FIG. 3 illustrates an example of a suitable computing and networking environment 300 that may be used to implement various aspects of the present disclosure described in FIGS. 1-3A and 3B. As illustrated, the computing and networking environment 300 includes a general purpose computing device 300, although it is contemplated that the networking environment 300 may include one or more other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the computer 300 may include various hardware components, such as a processing unit 302, a data storage 304 (e.g., a system memory), and a system bus 306 that couples various system components of the computer 300 to the processing unit 302. The system bus 306 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 300 may further include a variety of computer-readable media 308 that includes removable/non-removable media and volatile/nonvolatile media, but excludes transitory propagated signals. Computer-readable media 308 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computer 300. Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The data storage or system memory 304 includes computer storage media in the form of volatile/nonvolatile memory such as read only memory (ROM) and random access memory (RAM). A basic input/output system (BIOS), containing the basic routines that help to transfer information between elements within the computer 300 (e.g., during start-up) is typically stored in ROM. RAM typically contains data and/or program modules that are immediately accessible to and/or presently being operated on by processing unit 302. For example, in one embodiment, data storage 304 holds an operating system, application programs, and other program modules and program data.

Data storage 304 may also include other removable/non-removable, volatile/nonvolatile computer storage media. For example, data storage 304 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media, described above and illustrated in FIG. 3, provide storage of computer-readable instructions, data structures, program modules and other data for the computer 300.

A user may enter commands and information through a user interface 310 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices are often connected to the processing unit 302 through a user interface 310 that is coupled to the system bus 306, but may be connected by other interface and bus structures, such as a parallel port, game port or a universal serial bus (USB). A monitor 312 or other type of display device is also connected to the system bus 306 via an interface, such as a video interface. The monitor 312 may also be integrated with a touch-screen panel or the like.

The computer 300 may operate in a networked or cloud-computing environment using logical connections of a network interface or adapter 314 to one or more remote devices, such as a remote computer. The remote computer may be a personal computer, a server, a router, a network PC, a peer device or other common network node, and typically includes many or all of the elements described above relative to the computer 300. The logical connections depicted in FIG. 3 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 300 may be connected to a public and/or private network through the network interface or adapter 314. In such embodiments, a modem or other means for establishing communications over the network is connected to the system bus 306 via the network interface or adapter 314 or other appropriate mechanism. A wireless networking component including an interface and antenna may be coupled through a suitable device such as an access point or peer computer to a network. In a networked environment, program modules depicted relative to the computer 300, or portions thereof, may be stored in the remote memory storage device.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A method for generating workflows comprising:

receiving, at a computing device, voice data defining a request to perform a task corresponding to operations of an enterprise;

converting, using the computing device, the voice data to text data;

based on the text data, identifying, using the computing device, an application programming interface (API) associated with a first service defining an executable business function, wherein identifying the API comprises mapping the text data to a symbol graph stored in a memory accessible by the computing device, the symbol graph including a plurality of nodes, each node including textual elements associated with respective APIs;

based on the API, identifying, using the computing device, a user-interface (UI) component from a library including a plurality of user-interface components, wherein the UI component corresponds to a second service defining an executable business function capable of performing a portion of the task; and generating, at the computing device, a workflow including the UI component, wherein the workflow may be utilized by a user to complete the task.

2. The method of claim 1, identifying the API further comprises mapping a portion of the text data to a parameter of the API.

3. The method of claim 1, wherein each of the plurality of UI components is a web component, the method further comprising mapping the first service associated with the API to a particular UI component of the library of UI components.

4. The method of claim 3, further comprising storing metadata with the first service during the mapping.

5. The method of claim 1, further comprising:

monitoring responses to the workflow to identify a pattern across multiple users; and modifying the workflow based on the pattern.

6. The method of claim 1, wherein the workflow is a visual workflow visualizing the UI component, the method further comprising presenting the workflow to the user at a client device.

7. The method of claim 1, wherein the converting the voice data to text data comprises processing the voice data using natural language processing algorithms.

8. A non-transitory computer-readable medium encoded with instructions for generating workflows, the instructions being executable by a processor such that, when executed by the processor, the instructions cause the processor to comprising:

receive voice data defining a request to perform a task corresponding to operations of an enterprise;

convert the voice data to text data;

based on the text data, identify an application programming interface (API) associated with a first service defining an executable business function, wherein identifying the API comprises mapping the text data to a symbol graph stored in a memory accessible by the processor, the symbol graph including a plurality of nodes, each node including textual elements associated with respective APIs;

based on the API, identify a user-interface (UI) component from a library including a plurality of UI components, wherein the UI component corresponds to a second service defining an executable business function capable of performing a portion of the task; and generate a workflow including the UI component, wherein the workflow may be utilized by a user to complete the task.

9. The non-transitory computer-readable medium of claim 8, wherein the instructions further cause the processor to identify the API by mapping a portion of the text data to a parameter of the API.

10. The non-transitory computer-readable medium of claim 8, wherein each of the plurality of UI components is a web component, and the instructions further cause the processor to map the first service associated with the API to a particular UI component of the library of UI components.

11. The non-transitory computer-readable medium of claim 10, wherein the instructions further cause the processor to store metadata with the first service during the mapping.

12. The non-transitory computer-readable medium of claim 8, wherein the instructions further cause the processor to:

monitor responses to the workflow to identify a pattern across multiple users; and modify the workflow based on the pattern.

13. The non-transitory computer-readable medium of claim 8, wherein the workflow is a visual workflow visualizing the UI component, and the instructions further cause the processor to present the workflow to the user at a client device.

14. The non-transitory computer-readable medium of claim 8, wherein the the voice data to text data includes processing the voice data using natural language processing algorithms.

15. A system for generating workflows comprising:

a computing device to:

receive voice data defining a request to perform a task corresponding to operations of an enterprise;

convert the voice data to text data;

based on the text data, identify an application programming interface (API) associated with a first service defining an executable business function, wherein identifying the API comprises mapping the text data to a symbol graph stored in a memory accessible by the processor, the symbol graph including a plurality of nodes, each node including textual elements associated with respective APIs;

based on the API, identify a user-interface (UI) component from a library including a plurality of UI components, wherein the UI component corresponds to a second service defining an executable business function capable of performing a portion of the task; and generate a workflow including the UI component, wherein the workflow may be utilized by a user to complete the task.

16. The system of claim 15, wherein the computing device is further to map a portion of the text data to a parameter of the application programming interface.

17. The system of claim 15, wherein each of the plurality of UI components is a web component, the computing device further to map the first service associated with the API to a particular UI component of the library of UI components.

18. The system of claim 17, wherein the computing device is further to store metadata with the first service during the mapping.

19. The system of claim 17, wherein the computing device is further to:

monitor responses to the workflow to identify a pattern across multiple users; and modify the workflow based on the pattern.

20. The system of claim 17, wherein the workflow is a visual workflow visualizing the UI component, and the computing device is further to present the workflow to the user at a client device.

* * * * *